E. W. BROOMALL.
CREAM SEPARATOR.
APPLICATION FILED DEC. 15, 1905.
No. 904,600. Patented Nov. 24, 1908.
FIG. 1.
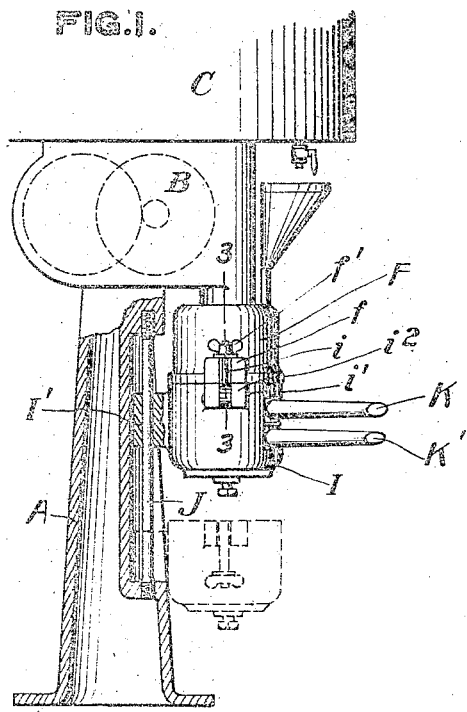
FIG. 2.
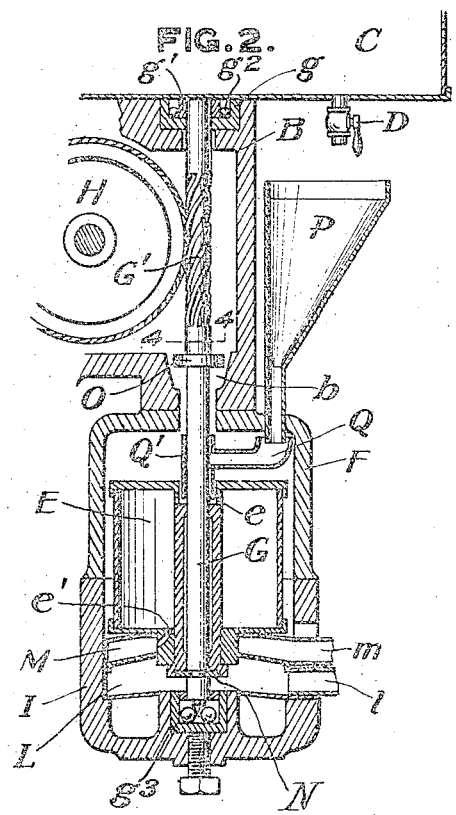
FIG. 3.
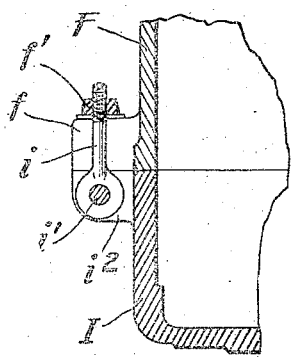
FIG. 4.
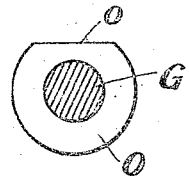
FIG. 5.
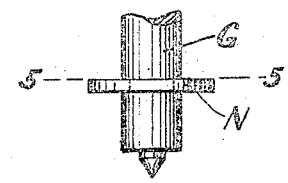
FIG. 6.
WITNESSES:
Clarence W. Carroll.
D. Gurnee.
INVENTOR:
Edgar W. Broomall
by Osgood & Davis
his attorneys

UNITED STATES PATENT OFFICE.

EDGAR W. BROOMALL, OF ROCHESTER, NEW YORK.

CREAM-SEPARATOR.

No. 904,600.      Specification of Letters Patent.      Patented Nov. 24, 1908.

Application filed December 15, 1905. Serial No. 291,867.

*To all whom it may concern:*

Be it known that I, EDGAR W. BROOMALL, a citizen of the United States, and resident of Rochester, in the county of Monroe and State of New York, have invented certain new and useful Improvements in Cream-Separators, of which the following is a specification.

This invention relates to cream separators. Its object is to produce a separator of simple and strong construction, that can be easily taken apart for the purpose of cleaning or repairing.

In the drawings:—Figure 1 is a side view of a separator partially in section; Fig. 2 is a vertical section, enlarged, of part of the separator shown in Fig. 1; Fig. 3 is a vertical section on the line 3—3 of Fig. 1; Fig. 4 is a cross section on the line 4—4 of Fig. 2 showing details; Fig. 5 is a cross section on the line 5—5 of Fig. 6; and Fig. 6 is a side view of the part shown in Fig. 5.

A represents a standard of suitable form to support the separator. A casing B on the top of the standard contains the operating mechanism, and above this is a tank C to contain the milk supply which is discharged therefrom into the separator through the cock D.

The rotary separating bowl E is contained within the lower casing F. The separating bowl E has at its upper end ducts $e$ through which the fresh milk is admitted to the bowl. The cream is discharged from the bowl through the ducts $e'$, and the milk through ducts not shown in the drawings. The bowl E is attached to the vertical spindle G in any suitable manner, so that it is rotative therewith and removable therefrom. The spindle G extends through the casings B and F. At its upper end it is journaled in a bearing comprising the cup $g$, the ring $g'$ and the ball bearings $g^2$, while its lower end is supported in the step bearing $g^3$. For the purpose of rotating the spindle G a gear H is shown that meshes with the worm G' on the upper end of the spindle. The gear H is in turn operated by suitable gearing (indicated by dotted lines in Fig. 1), connected with a hand operated crank or other driving means. Access is had to the casing F which contains the separating bowl, by means of the removable cap I. This cap I, which contains the step bearing $g^3$ for the spindle G, also contains other parts of the separator presently to be described, when locked to the casing F. One of the locks that secures the cap I to the casing F is shown in Fig. 3, and is a pin $i$ that is pivoted at $i'$ between lugs $i^2$, $i^2$ on the cap I, and which is adapted to enter between corresponding lugs $f$, $f$ on the casing F, and to be secured thereto by the thumb screw $f'$.

The cap I is provided with a flange I' that receives a vertical guide rod J secured to the standard A, so that the cap can slide up and down upon said guide, and when detached from the casing F will be supported beneath the separator in the position shown by dotted lines in Fig. 1. The cap I also contains vessels which receive, respectively, the cream and milk from the outlets of the separating bowl, and conduct the cream and milk to the spouts K and K', respectively. The vessel that receives the milk from the bowl is a pan L, which has an outlet at $l$ leading to the spout K'. The vessel that receives the cream from the separating bowl is a closed pan M, which fits upon and covers over the pan L. The pan M incloses the milk discharge ducts leading from the separating bowl, and has an outlet $m$ that leads to the cream discharge spout K.

From the above description, it is obvious that when the cap I is dropped from the casing F, the step bearing $g^3$, and the pans L and M are removed. It is also apparent that the separating bowl is exposed when these parts are removed, so that it too can be readily removed from the spindle after the cleft disk N (see Fig. 5) has been withdrawn from the groove in the spindle indicated by dotted lines in Fig. 5.

When the cap I is removed from the casing F, the spindle G drops until the shoulder O (see Fig. 4) engages the tapered socket $b$ in the casing B. This shoulder O has a straight edge $o$, which when it engages the tapered socket $b$ holds the spindle against rotation. In this position of the spindle its upper end, above the connection with the driving mechanism, is still within the bearing cup $g$. The shoulder O and bearing cup $g$ brace the spindle to resist the strain incident to removing and replacing the bowl upon its lower end.

The operation of the separator is as follows: The separator bowl is set in motion, and the milk that is to be separated is drawn from the reservoir or tank C into a funnel P, which leads to the trough Q. This latter is attached to a collar Q′ that encircles the spindle and extends down to the ducts e, through which the milk is admitted to the separating bowl. The collar Q′ is large enough for the milk to pass between it and the spindle. In the separating bowl the fresh milk is separated under the centrifugal force generated by the rotation of the bowl into cream that passes out through the ducts e′ to the pan M and thence to the spout K, and skimmed milk that passes out through the ducts not shown to the pan L and thence to the spout K′.

What I claim is:—

1. In a centrifugal separator, the combination with a suitable frame, of a vertical spindle, rotatively supported therein; a removable step bearing for said spindle; driving mechanism for said spindle; a separating bowl; and means for detachably securing said bowl upon said spindle, below its connection with said driving mechanism, whereby said bowl is adapted to be withdrawn from the lower end of said spindle.

2. In a centrifugal separator, the combination with a suitable frame, of a vertical spindle, rotatively supported therein; driving mechanism for said spindle; a separator bowl; means whereby said bowl is removably supported upon said spindle, below its connection with the driving mechanism; a removable casing around said bowl; and a step bearing for said spindle, within said removable casing and removable therewith.

3. In a centrifugal separator, the combination with a suitable frame, of a vertical spindle, rotatively supported therein; driving mechanism for said spindle; a separator bowl; means whereby said bowl is removably supported upon said spindle, below its connection with the driving mechanism; a fixed casing inclosing the upper part of said bowl; a removable casing inclosing the remainder of said bowl; detachable means whereby the lower casing is supported by the upper casing; and a step bearing for said spindle within said removable casing and removable therewith.

4. In a centrifugal separator, the combination with a suitable frame, of a vertical spindle, rotatively supported within said frame; a removable step bearing for said spindle; driving mechanism for said spindle; a separator bowl; means for detachably securing said bowl upon said spindle; and a support upon said frame for said step bearing adapted to sustain both said bearing and said shaft, and having a sliding connection with said frame, whereby, when released, it falls away from said spindle to permit the bowl to be withdrawn from said spindle.

5. In a centrifugal separator, the combination with a suitable frame, of a vertical spindle, rotatively supported therein; driving mechanism for said spindle; a separator bowl; means whereby said bowl is removably supported upon said spindle, below its connection with the driving mechanism; a removable casing around said bowl; and removable vessels contained within said casing, adapted to receive, respectively, cream and skimmed milk from said bowl and to deliver them to suitable discharge spouts; substantially as shown and described.

6. In a centrifugal separator, the combination with the vertical, rotary spindle G, having the shoulder O with the straight edge o, of a suitable frame having the tapered recess b adapted to engage said shoulder O when the spindle falls from its operating position; driving mechanism for said spindle located above said shoulder; and a fixed part adjacent to said spindle, and located above said driving mechanism, and adapted to brace said spindle against lateral pressure when its shoulder O is in engagement with said recess b; substantially as shown and described.

7. In a centrifugal separator, the combination with a suitable frame, of a vertical spindle, rotatively supported therein; and having a transverse groove at its lower end; driving mechanism for said spindle; a separator bowl adapted to fit upon said spindle; and the slotted disk N adapted to enter said groove in said spindle and to removably support said bowl; substantially as shown and described.

8. In a centrifugal separator, the combination with a suitable frame, of a vertical spindle, rotatively supported therein; driving mechanism for said spindle; a separator bowl attached to one end of said spindle; the vertical guide rod J in said frame; the casing I, adapted to contain the bowl, and slidingly attached to said rod by the flange I′; and means for locking said casing in position around said bowl; substantially as shown and described.

EDGAR W. BROOMALL.

Witnesses:
C. S. DAVIS,
D. GURNEE.